(12) United States Patent
Min et al.

(10) Patent No.: US 8,314,168 B2
(45) Date of Patent: *Nov. 20, 2012

(54) POLYCARBONATE RESIN COMPOSITIONS

(75) Inventors: Sung Sig Min, Seoul (KR); Byung Choon Lee, Seoul (KR); Han Su Lee, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 245 days.

This patent is subject to a terminal disclaimer.

(21) Appl. No.: 11/683,321

(22) Filed: Mar. 7, 2007

(65) Prior Publication Data

US 2007/0213435 A1 Sep. 13, 2007

Related U.S. Application Data

(63) Continuation-in-part of application No. PCT/KR2006/002355, filed on Jun. 20, 2006.

(30) Foreign Application Priority Data

Jun. 29, 2005 (KR) .................. 10-2005-0057022
Jun. 19, 2006 (KR) .................. 10-2006-0054981

(51) Int. Cl.
*C08G 18/77* (2006.01)

(52) U.S. Cl. .................. 524/115; 524/121; 524/140

(58) Field of Classification Search ............... 524/115
See application file for complete search history.

(56) References Cited

U.S. PATENT DOCUMENTS

| | | | |
|---|---|---|---|
| 4,948,837 A | 8/1990 | Wittmann et al. | |
| 5,252,693 A * | 10/1993 | Ishihara et al. ............... | 526/347 |
| H1901 H | 10/2000 | Mason | |
| 6,127,465 A | 10/2000 | Nodera | |
| 6,369,142 B1 | 4/2002 | Nodera et al. | |
| 6,403,683 B1 | 6/2002 | Kobayashi | |
| 6,664,362 B2 | 12/2003 | Kobayashi | |
| 7,186,767 B2 | 3/2007 | Seidel et al. | |
| 7,220,790 B2 | 5/2007 | Seidel et al. | |
| 7,671,143 B2 | 3/2010 | Lee et al. | |
| 2001/0025082 A1 | 9/2001 | Park | |
| 2004/0063824 A1 * | 4/2004 | Takagi et al. ................. | 524/115 |
| 2004/0106731 A1 | 6/2004 | Seidel et al. | |
| 2005/0038149 A1 | 2/2005 | Hashimoto et al. | |
| 2007/0155857 A1 | 7/2007 | Lee et al. | |
| 2007/0213435 A1 | 9/2007 | Min et al. | |
| 2007/0213437 A1 | 9/2007 | Nagatoshi | |

FOREIGN PATENT DOCUMENTS

| | | |
|---|---|---|
| CN | 1487976 A1 | 4/2004 |
| JP | 2000-086844 A | 3/2000 |
| JP | 2000-086845 A | 3/2000 |
| JP | 2000-086847 A | 3/2000 |
| JP | 2003-096288 A | 4/2003 |
| JP | 2004-107506 A | 4/2004 |
| JP | 2004-210916 A | 7/2004 |
| KR | 10-2001-0019451 A | 3/2001 |
| KR | 10-2000-0049833 | 8/2001 |
| KR | 10-2001-76179 A | 8/2001 |
| KR | 10-2003-0030422 A | 4/2003 |
| KR | 10-2004-0090386 A | 10/2004 |
| KR | 10-2006-0037581 | 5/2006 |
| KR | 20060037581 A | 5/2006 |
| WO | 2007/001130 A1 | 1/2007 |
| WO | 2007/078079 A1 | 7/2007 |

OTHER PUBLICATIONS

International Search Report in commonly owned International Application No. PCT/KR2006/005673, mailed Mar. 22, 2007.
International Search Report in counterpart International Application No. PCT/KR2006/002355, mailed on Aug. 21, 2006.
Extended European Search Report in counterpart European Application No. 06768944, dated Aug. 4, 2009.
Database WPI Week 200714, Thomson Scientific, London, GB; AN 2007-135726, XP002538602 & KR 2006 037 581 A (Cheil Ind. Inc.) May 3, 2006, Abstract.
Extended European Search Report in commonly owned European Application No. 06835377, dated Aug. 6, 2009.
Chinese Office Action in counterpart Chinese Application o. 200680022757.4, dated Apr. 29, 2010.
English translation of Chinese Office Action in counterpart Chinese Application o. 200680022757.4, dated Apr. 29, 2010.
Office Action in commonly owned U.S. Appl. No. 11/678,112, mailed Jan. 12, 2009.

* cited by examiner

*Primary Examiner* — Doris Lee
(74) *Attorney, Agent, or Firm* — Summa, Additon & Ashe, P.A.

(57) ABSTRACT

A polymer composition includes a polycarbonate resin, a syndiotactic polystyrene resin, a core-shell graft copolymer, and a phosphate ester compound. In some embodiments, the compositions have one or more of good impact strength, Falling Dart impact strength, chemical resistance, and flowability.

20 Claims, No Drawings

POLYCARBONATE RESIN COMPOSITIONS

CROSS-REFERENCE TO RELATED APPLICATIONS

This application is a continuation-in-part application under 35 U.S.C. §365 (c) claiming the benefit of the filing date of PCT Application No. PCT/KR2006/002355, filed Jun. 20, 2006, and designating the United States. The PCT Application claims the benefit of the earlier filing date of Korean Patent Application No. 10-2005-0057022, filed Jun. 29, 2005 and Korean Patent Application No. 10-2006-0054981, filed Jun. 19, 2006. The contents of the PCT Application, Korean Patent Application No. 10-2005-0057022, and Korean Patent Application No. 10-2006-0054981 are incorporated herein by reference in their entirety.

BACKGROUND OF THE INVENTION

1. Field

The invention relates to polymer compositions, particularly those comprising a polycarbonate resin.

2. Description of the Related Art

Polycarbonate resins have been widely used as an engineering plastic material. Particularly, the polycarbonate resins are extensively used in housings and other parts of portable electronic devices including mobile phones. Certain physical or mechanical properties of these polycarbonate-based articles may deteriorate as these articles are used frequently. Therefore, such polycarbonate resins often require good impact strength. Additionally, polycarbonate based compositions may require good flowability and thermal stability as the compositions are applied to heat emitting products, such as automobile parts, computer housings and office supplies.

It is well known in the art that other polymers, when mixed with a polycarbonate resin, may provide enhanced chemical resistance and impact resistance. However, the combination of other polymers with a polycarbonate resin often results in weld strength deterioration, decreased heat resistance, delamination, and loss of aesthetic appeal. In addition, large amounts of other polymers are often needed to affect any positive change in impact resistance or chemical resistance of polycarbonate resins. Polycarbonates also have poor compatibility with some polymer mixtures. Accordingly, there is a need to develop polycarbonate resin compositions having improved chemical resistance and/or flowability while maintaining the composition's impact resistance and outward physical appearance when exposed to environmental stress such as chemicals.

SUMMARY

Described herein are polymer compositions. More particularly, the polymer compositions are polycarbonate resin compositions. In one embodiment, a polymer composition includes a polycarbonate resin, a syndiotactic polystyrene resin, a core-shell graft copolymer and a phosphate ester compound. In some embodiments, the polymer composition includes about 80 to about 98.5 parts by weight of a polycarbonate resin, about 0.5 to about 10 parts by weight of a syndiotactic polystyrene resin, about 1 to about 30 parts by weight of a core-shell graft copolymer, and about 0.01 to about 10 parts by weight of a phosphate ester compound.

In one embodiment, the polycarbonate resin is one or more selected from the group consisting of a linear polycarbonate, a branched polycarbonate, and a polyester-carbonate copolymer. In some embodiments, the syndiotactic polystyrene resin has syndiotacticity of greater than 97%. In some embodiments, the core-shell graft copolymer is a copolymer of a rubber polymer core and unsaturated monomers grafted to the polymer core. In some embodiments, the rubber polymer core comprises one or more rubbers selected from the group consisting of $C_{4-6}$ diene rubbers, acrylate rubbers, and silicone rubbers. In some embodiments, the unsaturated monomers grafted to the polymer core are selected from the group consisting of $C_1$-$C_8$ methacryl acid alkyl ester, $C_1$-$C_8$ methacryl acid ester, maleic anhydride, and $C_1$-$C_4$ alkyl or phenyl N-substituted maleimde.

In certain embodiments, the phosphate ester compound is represented by the Formula (II):

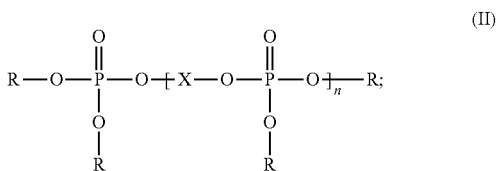

(II)

In formula (II), each R is independently selected from $C_{6-20}$ aryl or alkyl-substituted $C_{6-20}$ aryl, each X is independently selected from $C_{6-30}$ arylene or alkyl-substituted $C_{6-30}$ arylene, and n is an integer of 0, 1, 2, or 3.

In some embodiments, the compositions have enhanced physical, mechanical, or chemical properties. In one embodiment, the composition has impact strength of at least about 70 kg·cm/cm when a specimen of the composition is tested according to the standard ASTM D256 A (⅛" notched) at 23° C. In another embodiment, the composition has impact strength of at least about 81 kg·cm/cm when a specimen of the composition is tested according to the standard ASTM D256 A (⅛" notched) at 23° C. In another embodiment, the composition has impact strength of at least about 50 kg·cm/cm when a specimen of the composition is tested according to the standard ASTM D256 A (¼" notched) at 23° C. In some embodiments, the composition has impact strength of at least about 57 kg·cm/cm when a specimen of the composition is tested according to the standard ASTM D256 A (¼" notched) at 23° C.

In some embodiments, the composition has Falling Dart impact strength of at least about 1000 N when a specimen of the composition, the specimen measuring 3 mm×100 mm×100 mm, is tested according to the standard ASTM D3029. In some embodiments, the composition has Falling Dart impact strength of at least about 800 N when a specimen of the composition is subject to a chemical treatment and the chemically treated specimen is tested according to the standard ASTM D3029 and wherein the chemical treatment comprises submerging the specimen in paint thinner for 1 second and thereafter drying the specimen at 80° C for 30 minutes. In some embodiments, the chemically treated specimen has a brittle fracture rate of equal to or less than about 25% after the specimen is tested according to the standard ASTM D3029. In some embodiments, the composition has an injection flow length of greater than or equal to about 90 mm, when a specimen of the composition, the specimen in the shape of a spiral, is extruded at 260 to 330° C. from a 10 oz extruder into a mold at 60 to 100° C.

In certain embodiments, the composition is in the form of a shaped article. For example, the composition may be shaped in the form of a part or portion of a device. In one embodiment, an electronic device includes an electrical circuit and a housing enclosing at least part of the electrical circuit, the housing comprising a portion, which comprises the composition as further described herein. In another embodiment, an electronic device includes a molded article comprising a polycarbonate resin, a syndiotactic polystyrene resin, a core-shell graft copolymer, and a phosphate ester compound. Further, the molded article may further include a surface, and a coating layer formed on the surface of the molded article. In certain embodiments, the coating layer includes a residual amount of an organic solvent.

In one embodiment, a method of making an electronic device includes providing an electrical circuit, providing a housing comprising a portion, and enclosing at least part of the electrical circuit within the housing. In some embodiments, the portion includes the compositions as further described herein.

DETAILED DESCRIPTION OF THE EMBODIMENTS

As noted above, one aspect of this invention relates to a polymer composition. According to various embodiments, the polymer composition comprises a polycarbonate resin, a syndiotactic polystyrene resin, a core-shell graft copolymer and a phosphate ester compound. Shaped articles comprising the polymer compositions of the embodiments show enhanced physical or mechanical properties as compared to other compositions. The shaped articles of the embodiments also demonstrate one or more of improved chemical resistance, flowability, and impact strength, and fatigue resistance over other compositions.

In some embodiments, a composition comprises a polycarbonate resin, a syndiotactic polystyrene resin, a core-shell graft copolymer, and a phosphate ester compound. In certain embodiments, the composition includes about 80 to about 98.5 parts by weight of the polycarbonate resin, about 0.5 to about 10 parts by weight of the syndiotactic polystyrene resin, about 1 to about 30 parts by weight of the core-shell graft copolymer, and about 0.01 to about 10 parts by weight of the phosphate ester compound.

These components are further described herein:
Polycarbonate Resin

The polycarbonate resin used in some embodiments includes a polycarbonate compound or a mixture of two or more polycarbonate compounds. The resulting polymer of the polycarbonate compound or mixture of two or more polycarbonate compounds is also referred to as a polycarbonate resin. The polycarbonate compounds include homopolymers or copolymers containing a repeating ester group. For example, the polycarbonate compounds include linear or branched polycarbonate compounds, and further include polyester carbonate copolymers, silicone-polycarbonate copolymers, and other copolymers containing carbonate. The skilled artisan will appreciate additional examples of the polycarbonate compounds. Additionally, a homopolymer of a polycarbonate resin, a copolymer of polycarbonate resin, or mixtures thereof may be used according to some embodiments.

Typically, one or more polycarbonate compounds may be obtained from a reaction of one or more diphenols with a carbonate precursor or phosgene in the presence of a molecular weight controlling agent and usually in the presence of a catalyst. A reaction involving two diphenols may result in a copolymeric polycarbonate compound. Typical examples of the diphenol used include hydroquinone, resorcinol, 4,4'-dihydroxydiphenyl, bis(4-hydroxyphenyl)methane, bis {(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (generally called bisphenol A), 2,2-bis{(4-hydroxy-3-methyl)phenyl}propane, 2,2-bis (3,5-dimethyl-4-hydroxyphenyl)propane, 2,2-bis-(3-chloro-4-hydroxyphenyl)-propane, 2,2-bis {(4-hydroxy-3,5-dimethyl)phenyl}propane, 2,2-bis {(3,5-dibromo-4-hydroxy)phenyl}propane, 2,2-bis{((3-isopropyl-4-hydroxy)phenyl}propane, 2,2-bis {(4-hydroxy-3-phenyl)phenyl}propane, 2,2-bis(4-hydroxyphenyl)butane, 2,2-bis (4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis (4-hydroxyphenyl)cyclohexane, 1,1-bis(4-hydroxyphenyl)-4-isopropylcyclohexane, 2,2-bis-(3,5-dichloro-4-hydroxyphenyl)-propane, 2,2-bis-(3,5-dibromo-4-hydroxyphenyl)-propane 1,1-bis(4-hydroxyphenyl)-3,3,5-trimethylcyclohexane, bis(4-hydroxyphenyl)sulfide, bis(4-hydroxyphenyl)sulfone, bis(4-hydroxyphenyl) ketone, bis(4-hydroxyphenyl) ether and halogenated bisphenol including 2,2-bis (3,5-dibromo-4-hydroxyphenyl)propane 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis (4-hydroxyphenyl)-5,7-dimethyladamantane, 4,4'-dihydroxydiphenyl sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether and 4,4'-dihydroxydiphenyl ester. Typically, the carbonate precursor is a carbonyl halide, carbonate ester, haloformate or the like. Specific examples of the carbonate precursor include phosgene, diphenyl carbonates and dihaloformates of diphenols.

In some embodiments, the polycarbonate resin is prepared by reacting a diphenol represented by the following formula (I) with a phosgene, a halogen formate or a carboxylic acid diester:

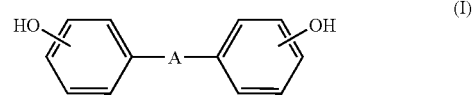

In formula (I), A may be a single bond, a $C_{1-5}$ alkylene group, a $C_{1-5}$ alkylidene group, a $C_{5-6}$ cycloalkylidene group, S or $SO_2$.

In one embodiment, the polycarbonate compound includes 2,2-bis-(4-hydroxyphenyl)-propane polycarbonate compound, which is a linear polycarbonate compound. In another embodiment, a branched polycarbonate compound can be obtained by reacting a polyfunctional aromatic compound such as trimelitic anhydride and trimelitic acid with dihydric phenol and a carbonate precursor. In another embodiment, another polycarbonate compound can be obtained by reacting a difunctional carboxylic acid with dihydric phenol and a carbonate precursor. In another embodiment, some portion of the polycarbonate resin may be replaced with an aromatic polyester-carbonate resin. In the foregoing embodiment, the aromatic polyester-carbonate resin may be obtained by polymerization of the polycarbonate in the presence of an ester precursor, such as difunctional carboxylic acid.

In some embodiments, a polycarbonate resin having a weight average molecular weight ($M_w$) of about 10,000 to about 200,000 is used. In other embodiments, a polycarbonate resin having $M_w$ of about 15,000 to about 80,000 is used.

However, the foregoing values are not intended to limit the scope of the polycarbonate resin which may be used in certain embodiments.

In some embodiments, the polycarbonates resin may be substituted in any manner. In some embodiments, the polycarbonate resin is branched. In some embodiments, the polycarbonate resin may be branched by incorporation of about 0.05 to about 2 mol % of tri- or higher functional compounds, based to total quantity of diphenols used. For example, compounds with three or more phenolic groups may be used in forming the polycarbonate resin.

In some embodiments, the thermoplastic resin composition comprises about 80 to about 98.5 parts by weight of a polycarbonate resin, which includes, for example, approximately 81, 82, 83, 84, 85, 86, 87, 88, 89, 90, 91, 92, 93, 94, 95, 96, 97, or 98 parts by weight. In certain embodiments, the composition may contain the polycarbonate resin in an amount within a range formed by the two of the foregoing approximate parts by weight. In certain embodiments, the thermoplastic composition comprises an amount of a polycarbonate resin ranged between two of the foregoing values. In other embodiments, the thermoplastic composition comprises about 60 to about 80 parts by weight of the polycarbonate resin. In a few embodiments, the thermoplastic composition comprises up to about 99.5 parts by weight of the polycarbonate resin. Here, the unit "parts by weight" refers to a relative weight of each component given that the total weight of the one or more of the polycarbonate resin, the syndiotactic polystyrene resin, the core-shell graft copolymer, and the phosphate ester compound is 100 parts by weight.

Syndiotactic Polystyrene Resin

Syndiotactic polystyrene is a semicrystalline polymer synthesized from styrene monomer using a single-site catalyst, such as a metallocene. Because of its semicrystalline nature, syndiotactic polystyrene resin products exhibit performance attributes that are significantly different from those of amorphous styrenic materials. These properties may include, but are not limited to, a high melting point, good chemical and moisture resistance, and a high degree of dimensional stability.

Syndiotactic polystyrene can be differentiated from conventional styrenic polymers on the basis of molecular structure. Atactic, or general-purpose, polystyrene is produced with random stereochemistry, resulting in nonspecific placement of the cyclic aromatic portion of the molecule. In contrast, isotactic and syndiotactic polystyrene are made using stereo-specific catalysis techniques that result in highly ordered molecular structures. The pendant phenyl groups of syndiotactic polystyrene are arranged alternately on each side of the polymer backbone such that adjacent phenyl groups are on different sides of the polymer backbone.

Syndiotactic polystyrene catalysts are well known by persons having ordinary skill in the art. For example, syndiotactic polystyrene may be prepared by polymerizing one or more styrene monomers in the presence of a catalyst system comprising a metallocene catalyst and a cocatalyst. Such a metallocene catalyst may include one or two cycloalkanedienyl groups (such as cyclopentadienyl, indenyl, fluorenyl and derivatives thereof) bonded to a metal atom such as Ti, Zr, or Hf.

One method for polymerizing a styrene monomer is disclosed in U.S. Pat. No. 6,010,974. This patent describes several metallocene catalysts including alkyl-bridged binuclear metallocene catalysts, silyl-bridge binuclear metallocene catalysts, and alkyl-silyl bridged binuclear metallocene catalysts. Such catalysts may lead to production of polystyrene resins having a high stereoregularity, a high melting point and a good molecular weight distribution. Another example of a syndiotactic polystyrene catalyst system includes a metallocene catalyst and a co-catalyst, such as that disclosed in U.S. Pat. No. 6,284,700.

In some embodiments, the syndiotatic polystyrene resin has a syndiotactic degree of greater than 97%, including 98%, 99% and about 100% syndiotacticity. Other embodiments may include less than 97% syndiotactic degree. Certain physical or mechanical properties may be improved with high degrees of syndiotacticity.

In some embodiments, the thermoplastic resin composition comprises about 0.5 to about 10 parts by weight of a syndiotactic polystyrene resin, which includes, for example, approximately 1, 2, 3, 4, 5, 6, 7, 8, or 9 parts by weight. In certain embodiments, the composition may contain the syndiotactic polystyrene resin in an amount within a range formed by the two of the foregoing approximate parts by weight. In certain embodiments, the thermoplastic composition comprises an amount of a syndiotactic polystyrene resin ranged between two of the foregoing values. In other embodiments, the thermoplastic composition comprises about 10 to about 30 parts by weight of the syndiotactic polystyrene resin. In a few embodiments, the thermoplastic composition comprises less than about 0.5 parts by weight of the syndiotactic polystyrene resin. Here, the unit "parts by weight" refers to a relative weight of each component given that the total weight of the one or more of the polycarbonate resin, the syndiotactic polystyrene resin, the core-shell graft copolymer, and the phosphate ester compound is 100 parts by weight.

Core-shell Graft Copolymer

The core-shell graft copolymer used in some embodiments is a copolymer comprised of a core polymer and a plurality of monomers or polymers grafted from the core polymer. In some embodiment, the core polymer includes a rubber. In some embodiments, the core is in an amount of about 50 to about 90 parts by weight with reference to the total weight of the core-shell graft copolymer.

In some embodiments, the polymers grafted onto the core are formed by grafting with one or more unsaturated monomers. Such monomers may include $C_1$-$C_8$ methacrylic acid alkyl esters, $C_1$-$C_8$ methacryl esters, $C_1$-$C_8$ acrylic acid alkyl esters, maleic acid anhydrides, $C_1$-$C_4$ alkyl and phenyl N-substituted maleimide. The $C_1$-$C_8$ methacrylic acid alkyl esters and $C_1$-$C_8$ acrylic acid alkyl esters may be monohydryl alcohols of $C_1$-$C_8$ as esters of methacrylic acid and acrylic acid, respectively.

The rubber is polymerized with at least one of $C_1$-$C_4$ diene rubber monomer, acrylate rubber monomer and silicone rubber monomer. For example, the diene rubbers are butadiene rubber, acryl rubber, ethylene/propylene rubber, styrene/butadiene rubber, acrylonitrile/butadiene rubber, isoprene rubber, copolymer of ethylene-propylene-diene (EPDM), and so forth. For example, the acrylate rubber monomers are methyl acrylate, ethyl acrylate, n-propyl acrylate, n-butyl acrylate, 2-ethylhexyl acrylate, hexyl methacrylate, 2-ethylhexyl methacrylate, and so forth. In certain embodiment, a hardening agent may be used. Examples of the hardening agents include ethylene glycol dimethacrylate, propylene glycol dimethacrylate, 1,3-butylene glycol dimethacrylate, 1,4-butylene glycol dimethacrylate, allyl methacrylate, and triallyl cyanurate, and so forth.

Further, the silicone rubber monomers may be prepared from cyclosiloxane, and the examples of the silicone rubber monomers include one or more of hexamethyl cyclotrisiloxane, octamethyl cyclotetrasiloxane, decamethyl cyclopentasiloxane, dodecamethyl cyclohexasiloxane, trimethyltriphenyl cyclotrisiloxane, tetramethyltetraphenyl cyclotetrasiloxane, octaphenyl cyclotetrasiloxane, and so forth. In certain embodiment, a hardening agent may be used for preparation of the silicone rubber. Examples of the hardening agent are trimethoxymethylsilane, triethoxyphenylsilane, tetramethoxysilane, tetraethoxysilane, and so forth.

In some embodiments, one or more silicone rubbers, or a mixture of one or more silicone rubbers and one or more acrylate rubbers are used to enhance certain physical and mechanical properties of the compositions. In some embodiments, the one or more rubbers have a particle size based on an average diameter from about 0.4 to about 1 μm.

In some embodiments, the thermoplastic resin composition comprises about 1 to about 30 parts by weight of a core-shell graft copolymer resin, which includes, for example, approximately 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight. In certain embodiments, the composition may contain the core-shell graft copolymer resin in an amount within a range formed by the two of the foregoing approximate parts by weight. In certain embodiments, the thermoplastic composition comprises an amount of a core-shell graft copolymer resin ranged between two of the foregoing values. In other embodiments, the thermoplastic composition comprises about 1 to about 10 parts by weight of the core-shell graft copolymer resin. In a few embodiments, the thermoplastic composition comprises less than about 1 parts by weight of the core-shell graft copolymer resin. In a few embodiments, the thermoplastic composition comprises greater than about 30 parts by weight of the core-shell graft copolymer resin, including about 35, 40, 45, and 50 parts by weight of the core-shell graft copolymer resin. Here, the unit "parts by weight" refers to a relative weight of each component given that the total weight of the one or more of the polycarbonate resin, the syndiotactic polystyrene resin, the core-shell graft copolymer, and the phosphate ester compound is 100 parts by weight.

Phosphate Ester Compound

Some embodiments of the composition comprise a phosphate ester compound. In some of these embodiments, the composition comprises an aromatic phosphate ester. In some embodiments, the phosphate ester compound may be monomeric or oligomeric. In some of these embodiments, this compound has the following structural formula (II):

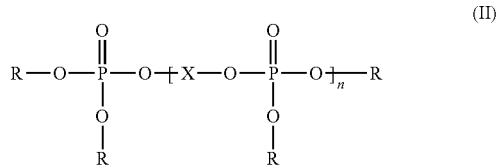

(II)

In some embodiments including a phosphate ester compound according to Formula (II), each R is independently $C_{6-20}$ aryl or alkyl-substituted $C_{6-20}$ aryl. Each R may be selected independently from another R. In some embodiments, R may be phenyl. In some embodiments, R may be alkyl such as methyl, ethyl, isopropyl, t-butyl, isobutyl, isoamyl, t-amyl or the like. In some embodiments, R is alkyl substituted phenyl, such as phenyl substituted with methyl, ethyl, isopropyl, or t-butyl.

In some embodiments, X is $C_{6-30}$ arylene or alkyl-substituted $C_{6-30}$ arylene. In certain embodiments, X is derived from a compound comprising two hydroxyaryl groups. In the compound comprising two hydroxyaryl groups, one aryl group may comprise more than one hydroxyl group. Thus, a compound comprising two hydroxyaryl groups comprises an aryl compound having two or more hydroxy groups.

For example, if X is derived from hydroquinone, then X would be a phenylene wherein a phenyl group would be disposed between the two oxygen atoms shown in the structural formula (as connected to X), and these oxygen atoms would be covalently bonded to the phenylene group in respective para positions. For another example, if X is derived from resorcinol, then X would be a phenylene wherein a phenyl group would be disposed between the two oxygen atoms shown in the structural formula (as connected to X), and these oxygen atoms would be covalently bonded to the phenylene group in respective meta positions. Other variations of this will be apparent to those having ordinary skill in the art. Thus, X can be derived from compounds such as hydroquinone, resorcinol, bisphenol A, naphthalene-2,6-diol, naphthalene-2,7-diol, and so forth.

As noted above, the phosphate ester may be monomer or oligomeric. In some embodiments, the phosphate ester includes one or more of a monomeric or oligomeric phosphate ester. In some embodiments in accordance with Formula (II) above, the n may be an integer of 0, 1, 2, or 3. In some embodiments, more than one compound represented by Formula (II) above may be the phosphate ester of the composition. Thus, some embodiments include mixtures of the phosphate ester compound as represented by the Formula (II) above with varying n values. For example, one embodiment includes two or more phosphate ester compounds according to Formula (II) above, each having the same or different n values.

However, some embodiments may use other phosphate esters including other aromatic phosphate esters. The phosphate esters include trialkyl derivatives such as triethyl or trioctyl phosphate, and triaryl derivatives such as triphenyl phosphate and aryl-alkyl derivatives such as 2-ethylhexyl-diphenyl phosphate. A person having ordinary skill in the art will understand other suitable phosphate esters for this application.

In certain embodiments, the composition may include about 0.01 to about 10 parts by weight of the one or more phosphate esters, which includes, for example, approximately 0.01, 0.05, 0.1, 0.5, 1, 2, 3, 4, 5, 6, 7, 8, 9, or 10 parts by weight. In certain embodiments, the composition may contain the one or more phosphate esters in an amount within a range formed by the two of the foregoing approximate parts by weight. In certain embodiments, the thermoplastic composition comprises an amount of one or more phosphate esters ranged between two of the foregoing values. In another embodiment, the composition includes about 0.01 to about 7 parts by weight of the one or more phosphate esters. In some embodiments, the polymer composition comprises less than about 0.01 parts by weight of one or more phosphate ester compounds. In other embodiments, the polymer composition comprises about 11, 12, 13, 14, 15, 16, 17, 18, 19, 20, 21, 22, 23, 24, 25, 26, 27, 28, 29, 30, 31, 32, 33, 34, 35, 36, 37, 38, 39, and about 40 parts by weight of the one or more phosphate ester compounds.

Additional Components

The polymer compositions can contain one or more compounds or polymers in addition to the foregoing components. Additional components or additives may be added to provide additional properties or characteristics to the composition or to modify existing properties (such as mechanical strength or heat deflection temperature) of the composition. For example, an inorganic filler such as glass fiber, carbon fiber, talc, silica, mica, and alumina may be added to improve mechanical strength and heat distortion temperature of the resin composition. In addition, the polymer composition may further include a heat stabilizer, an anti-oxidant, an ultraviolet absorbing agent, a light stabilizer, a flame retardant, a lubricant, a pigment and/or dye. One having ordinary skill in the art will appreciate that various additives may be added to the polymer compositions according to embodiments of the invention.

Preparation of Compositions

The polymer compositions can be prepared by mixing components including a polycarbonate resin, a syndiotactic polystyrene resin, a core-shell graft copolymer resin, and a phosphate ester compound. In some embodiments, one or more other additives may be mixed together with the components of the polymer composition. One or more component resins can be heated to melt prior to the mixing or the composition may be heated during the mixing. However, the mixing can occur when each components is in a solid, liquid, or dissolved state, or mixtures thereof In one embodiment, the above components are mixed together all at once. Alternatively, one or more components are added individually. For example, the polycarbonate resin may first be mixed with the phosphate ester compound, prior to mixing this admixture with additional components. Formulating and mixing the components may be made by any method known to those persons having ordinary skill in the art, or those methods that may be later discovered. The mixing may occur in a pre-mixing state in a device such as a ribbon blender, followed by further mixing in a Henschel mixer, Banbury mixer, a single screw extruder, a twin screw extruder, a multi screw extruder, or a cokneader.

In some embodiments, the polymer composition may be prepared by any known method. For example, the inventive composition may be prepared by mixing the components of the compositions and other additives at the same time and melt-extruding the mixture through an extruder so as to prepare pellets. The mixture may also be molded into a predetermined shape and cured to form a molded article.

In producing structural parts of various consumer products, the molded articles from the polycarbonate composition may be subject to various processing, which includes certain chemical treatments. In some embodiments, chemical treatments include coating, film forming, painting, welding, plating, etc. on a surface of the molded article. Typically these chemical treatments involve containing an organic solvent onto a surface of the molded article. The organic solvents to which some embodiments may be exposed include, for example, alcohols, aromatic hydrocarbons, aliphatic hydrocarbons, ethers, ketones, esters, mineral spirits, paint thinners, and so forth. Of these organic solvents, specific examples of the alcohols include methanol, ethanol, n-propyl alcohol, isopropyl alcohol, n-butyl alcohol, sec-butyl alcohol, t-butyl alcohol, n-hexyl alcohol, n-octyl alcohol, ethylene glycol, diethylene glycol, triethylene glycol, ethylene glycol monobutyl ether, ethylene glycol monoethyl ether acetate, diethylene glycol monoethyl ether, propylene glycol monomethyl ether, propylene monomethyl ether acetate, diacetone alcohol, acetone, and so forth. Specific examples of the aromatic hydrocarbons include benzene, toluene, xylene and so forth, specific examples of the ethers include tetrahydrofuran, dioxane and so forth, specific examples of the ketones include acetone, methyl ethyl ketone, methyl isobutyl ketone, diisobutyl ketone and so forth, and specific examples of the esters include ethyl acetate, propyl acetate, butyl acetate, propylene carbonate and so forth. These organic solvents maybe used alone or as a mixture of two or more of them. Another solvent that may be used is Stoddard Solvent, otherwise known as paint thinner.

One aspect of the invention provides a molded article after a chemical treatment. The molded article with a chemical treatment may have a coating layer of a certain chemical compound on the surface of chemical treatment. In one embodiment, the coating layer may contain an oil-based coating material. In another embodiment, the coating layer may contain a dye compound. In another embodiment, the coating layer may contain a residual amount of an organic solvent, more particularly, paint thinner.

In some embodiments, the housing or part of the electronic device may have a coating layer over a surface of the housing or part. In one embodiment, as discussed above, the coating layer comprises a residual amount of an organic solvent or an oil-base coating material.

Properties of the Compositions

Some embodiments of the composition have impact strength of at least about 70 kg·cm/cm when a specimen of the composition is tested according to the standard ASTM D256 A (1/8" notched) at 23° C. In some embodiments, the composition has impact strength of at least about 81 kg-cm/cm when a specimen of the composition is tested according to the standard ASTM D256 A (1/8" notched) at 23° C. In some embodiments, the composition has impact strength of at least about 83 kg·cm/cm when a specimen of the composition is tested according to the standard ASTM D256 A (1/8" notched) at 23° C.

Some embodiments of the composition have impact strength of at least about 50 kg·cm/cm when a specimen of the composition is tested according to the standard ASTM D256 A (1/4" notched) at 23° C. In some embodiments, the composition has impact strength of at least about 57 kg·cm/cm when a specimen of the composition is tested according to the standard ASTM D256 A (1/4" notched) at 23° C. In some embodiments, the composition has impact strength of at least about 59 kg·cm/cm when a specimen of the composition is tested according to the standard ASTM D256 A (1/4" notched) at 23° C.

The specimen for the impact resistance test has all four edges smoothly and squarely trimmed. The impact strength is the resistance to fracture when a sudden localized load is applied against the face of a panel held between supports. This value is usually obtained by dropping a 15.5 mm diameter dart(weight: 5kg) according to ASTM D3029 from increasing heights at the center of the board until the specimen fails. The height of drop, in millimeters (inches), that produces visible failure on the opposite face of the board is recorded as the index of resistance to impact.

Some embodiments of the composition have Falling dart impact strength of at least about 1000 N when a specimen of the composition, the specimen measuring 3 mm×100 mm×100 mm, is tested according to the ASTM D3029. Some embodiments of the composition have Falling dart impact strength of at least about 1170 N when a specimen of the composition, the specimen measuring 3 mm×100 mm×100 mm, is tested according to the standard ASTM D3029. Some embodiments of the composition have Falling dart impact strength of at least about 1200 N when a specimen of the composition, the specimen measuring 3 mm×100 mm×100 mm, is tested according to the standard ASTM D3029.

In some embodiments, the composition exhibit good chemical resistance. Chemical resistance may be measured by comparing the falling dart impact strength of a sample after it is submerged in an organic solvent. In some embodiments, the specimen measuring 3 mm×100 mm×100 mm is submerged in paint thinner for one second and thereafter dried at 80° C. for 30 minutes.

In some embodiments, the composition has Falling dart impact strength of at least about 800 N when a specimen of the composition is subject to a chemical treatment and the chemically treated specimen is tested according to the standard ASTM D3029 and wherein the chemical treatment comprises submerging the specimen in paint thinner for 1 second and thereafter drying the specimen at 80° C. for 30 minutes. In some embodiments, the composition has Falling dart impact strength of at least about 980 N when a specimen of the composition is subject to a chemical treatment and the chemically treated specimen is tested according to the standard. In some embodiments, the composition has Falling dart impact strength of at least about 1100 N when a specimen of the composition is subject to a chemical treatment and the chemically treated specimen is tested according to the standard ASTM D3029 and wherein the chemical treatment comprises submerging the specimen in paint thinner for 1 second and thereafter drying the specimen at 80° C. for 30 minutes.

In some embodiments, various paint thinners may be used independently or as mixtures with other solvents. Examples of the paint thinners include alcohols and ketones.

Brittle fracture rate may be measured after the type of damage on the resin composition was identified. In some embodiments, the composition has less than 25% of the brittle fracture rate, when a specimen of the composition is subject to a chemical treatment and the chemically treated specimen is tested according to the standard ASTM D3029 and wherein the chemical treatment comprises submerging the specimen in paint thinner for 1 second and thereafter drying the specimen at 80° C. for 30 minutes.

In some embodiment, the compositions demonstrated good flowability. In some embodiments, the compositions have an injection flow length of greater than about 90 mm, when a specimen having a 1 mm thickness of the sample, is injected through an injection machine at the resin temperature from 260 to 330° C. and into a mold at its temperature from 60 to 100° C. In some embodiments, the compositions have an injection flow length of greater than about 95 mm. In other embodiments, the compositions have an injection flow length of greater than or equal to about 100 mm.

Shaped Articles

A shaped article can be made using the polymer composition according to the foregoing embodiments. In some embodiments, this article is molded into various shapes. An extrusion molding machine such as a vented extruder may be used. The polymer composition of embodiments may be molded into various moldings using, for example, a melt-molding device. In embodiments, the polymer composition is formed into a pellet, which then may be molded into various shapes using, for example, injection molding, injection compression molding, extrusion molding, blow molding, pressing, vacuum forming or foaming. In one embodiment, the polymer composition can be made into a pellet using melt-kneading, and the resulting pellets are molded into moldings through injection molding or injection compression molding.

As noted, in one embodiment, the polymer compositions are formed into pellets. In other embodiments, the polymer compositions are formed into structural parts of various consumer products, including electronic devices and appliances. In some embodiments, the polymer compositions are molded into a housing or body of electronic or non-electronic devices. Examples of electrical devices, in which a molded article made of the blend of the composition according to embodiments of the invention are used, include printers, computers, word processors, keyboards, personal digital assistants (PDA), telephones, mobile phones, cameras, facsimile machines, copy machines, electronic cash registers (ECR), desk-top electronic calculators, PDAs, cards, stationery holders, washing machines, refrigerators, vacuum cleaners, microwave ovens, lighting equipment, irons, TV, VTR, DVD players, video cameras, radio cassette recorders, tape recorders, mini disc players, CD players, speakers, liquid crystal displays, MP3 players, and electric or electronic parts and telecommunication equipment, such as connectors, relays, condensers, switches, printed circuit boards materials, coil bobbins, semiconductor sealing materials, electric wires, cables, transformers, deflecting yokes, distribution boards, clocks, watches, and the like.

Another embodiment provides an electronic device which includes a housing or a part, which is made of a polymer composition comprising a polycarbonate resin, a syndiotactic polystyrene resin, a core-shell graft copolymer resin, and a phosphate ester compound. Some embodiments provide a method of making an electronic device, comprising providing an electrical circuit; providing a housing comprising a portion; and enclosing at least part of the electrical circuit with the housing, wherein the portion comprises the composition which comprises polycarbonate resin, a syndiotactic polystyrene resin, a core-shell graft copolymer resin, and a phosphate ester compound.

The invention is further described in terms of the following examples which are intended for the purpose of illustration and not to be construed as in any way limiting the scope of the present invention, which is defined by the claims. In the following examples, all parts and percentage are by weight unless otherwise indicated.

EXAMPLES

Preparation of the compositions including a polycarbonate resin, a syndiotactic polystyrene resin, a core-shell graft copolymer, and a phosphate ester compound in the following Examples and Comparative Examples were as follows.

(A) Polycarbonate Resin

The linear polycarbonate of bisphenol-A having 25,000 g/mol of weight-average molecular weight, PANLITE L-1250WP available from TEIJIN Co. of Japan was used.

(B) Syndiotactic Polystyrene Resin

Syndiotactic polystyrene, XAREC S100 available from IDEMITSU Co. of Japan, of which has a melting point of 250° C., a glass transition temperature of 100° C., and a specific gravity of 1.01, was used.

(C) Core-Shell Graft Copolymer ($c_1$) PALALOID EXL-2602 available from KUREHA Co. of Japan was used. This is a core-shell graft copolymer of 70 to 80 parts by weight of a butadiene rubber having a weight-average particle diameter of about 0.1 μm, and 20 to 30 parts by weight of a methacryl acid methyl ester monomer.

($c_2$) Metablen S 2100 available from Mitsubishi Rayon Co. of Japan. This is a core-shell graft copolymer of a rubber comprising 5 to 70 parts by weight of a dimethylsiloxane having a weight-average particle diameter of about 0.5 μm, and 30 to 95 by weight of a butylacrylate, and 30 to 40 parts by weight of a methyl methacrylate monomer were used as an impact strengthener.

(D) Phosphoric Acid Ester Compound ($d_1$) Resorcinol-Di (bis-2,6-dimethylphenyl) phosphate, available from Daihachi Co. as PX-200. This phosphate ester corresponds to a phosphate ester having chemical Formula (II) above, in which R is 2,6-dimethylphenyl, and X is derived from resorcinol, and n is 1.

($d_2$) triphenyl phosphate available as TPP from Daihachi Co. This phosphate ester corresponds to a phosphate ester having chemical Formula (II) above in which R is phenyl and n is 0.

Examples 1-7 and Comparative Examples 1-11

Pellets were prepared from the compositions in which components were blended in the amounts according to tables 1 and 2 using a twin-screw extruder with Φ=45 mm. A panel block was produced by extruding through 10 oz extruder at the resin temperature of 260 to 330° C. and by molding in a mold at its temperature of 60 to 100° C. from the pellet which was dried for more than three hours at 110° C. Notched Izod impact strength (⅛", ¼") of the block was measured according to ASTM D256 at 23° C. Further, for the purpose of the evaluation of chemical resistance of the resin compound, the 3 mm×100 mm×100 mm of a panel block was submerged for one second in paint thinner and thereafter was dried for 30 minutes at 80° C. The load of falling dart at a fixed point was measured and compared with the load prior to the submergence into the solvent. Further, brittle fracture rate was measured after the type of damage on the resin composition was identified. For the evaluation of flowability, a 1 mm thick spiral specimen was extruded from the 10 oz extruder at the resin temperature of 260 to 330° C. and into a mold at its temperature of 60 to 100° C. of mold temperature which was previously produced and then dried, and then the injection flow length of the block after injection was measured.

TABLE 1

|  |  | Examples | | | | | | |
|---|---|---|---|---|---|---|---|---|
|  |  | 1 | 2 | 3 | 4 | 5 | 6 | 7 |
| (A) |  | 93.5 | 93 | 92 | 92 | 90 | 89 | 89 |
| (B) |  | 1 | 1 | 2 | 2 | 4 | 4 | 4 |
| (C) | ($c_1$) | 5 | 5 | 5 | — | — | — | — |
|  | ($c_2$) | — | — | — | 5 | 5 | 5 | 5 |
| (D) | ($d_1$) | 0.5 | 1 | 1 | 1 | 1 | 2 | — |
|  | ($d_2$) | — | — | — | — | — | — | 2 |
| ⅛" IZOD impact strength (kg·cm/cm) |  | 84 | 83 | 83 | 82 | 83 | 81 | 83 |
| ¼" IZOD impact strength (kg·cm/cm) |  | 65 | 57 | 57 | 59 | 58 | 57 | 59 |
| Falling dart impact strength prior to submerging into a solvent (N) |  | 1200 | 1170 | 1170 | 1200 | 1230 | 1200 | 1200 |
| Falling dart impact strength after submerging into a solvent composition (N) |  | 850 | 980 | 980 | 1100 | 1100 | 1050 | 1070 |
| Brittle fracture rate after submerging into a solvent composition (%) |  | 20 | 15 | 15 | 0 | 0 | 0 | 0 |
| Injection flow length (mm) |  | 90 | 95 | 100 | 100 | 90 | 110 | 115 |

TABLE 2

|  |  | Comparative Examples | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| (A) |  | 100 | 98 | 95 | 95 | 98 | 93 | 93 | 96 | 79 | 62 | 78 |
| (B) |  | — | 2 | — | — | — | 2 | — | 2 | 15 | 2 | 2 |
| (C) | ($c_1$) | — | — | 5 | — | — | 5 | 5 | — | 5 | 35 | 5 |
|  | ($c_2$) | — | — | — | 5 | — | — | — | — | — | — | — |
| (D) | ($d_1$) | — | — | — | — | 2 | — | 2 | 2 | 1 | 1 | 15 |
|  | ($d_2$) | — | — | — | — | — | — | — | — | — | — | — |
| ⅛" IZOD impact strength (kg·cm/cm) |  | 82 | 83 | 83 | 84 | 80 | 83 | 80 | 80 | 82 | NB | 45 |
| ¼" IZOD impact strength (kg·cm/cm) |  | 10 | 11 | 60 | 60 | 10 | 58 | 57 | 10 | 42 | NB | 25 |
| Falling dart impact strength prior to submerging into a solvent composition (N) |  | 450 | 450 | 1200 | 1230 | 430 | 1200 | 1100 | 430 | 900 | 1250 | 500 |
| Falling dart impact strength after submerging into a solvent composition (N) |  | 300 | 350 | 500 | 800 | 300 | 1000 | 400 | 320 | 700 | 1050 | 320 |
| Brittle fracture rate after submerging into a solvent composition (%) |  | 100 | 100 | 80 | 30 | 100 | 10 | 80 | 100 | 55 | 0 | 100 |
| Injection flow length (mm) |  | 75 | 60 | 70 | 75 | 95 | 70 | 85 | 120 | 40 | 30 | 200 |

* NB in the table above stands for No Break.

According to the results in Tables 1 and 2, Examples 1 to 7, which employ a syndiotactic styrene polymer, a core-shell graft copolymer, and a phosphate ester compound at certain ratios improves the chemical resistance and flowability of the polycarbonate resins. At the sample time, impact resistance is maintained. This is in comparison with Comparative Examples 1 to 11 in which either only a polycarbonate was solely used, or one or less other components were absent, or a syndiotactic styrene group polymer, a core-shell graft copolymer, and a phosphoric acid ester compound were used at undesirable ratios. Further, in Example 3 and Comparative Example 6, flowability improves when a syndiotactic styrene polymer and a phosphorus ester compound were applied at the same time.

The skilled artisan will recognize the interchangeability of various features from different embodiments. Similarly, the various features and steps discussed above, as well as other known equivalents for each such feature or step, can be mixed and matched by one of ordinary skill in this art to perform compositions or methods in accordance with principles described herein. Although the invention has been disclosed in the context of certain embodiments and examples, it will be understood by those skilled in the art that the invention extends beyond the specifically disclosed embodiments to other alternative embodiments and/or uses and obvious modifications and equivalents thereof Accordingly, the invention is not intended to be limited by the specific disclosures of embodiments herein. Rather, the scope of the present invention is to be interpreted with reference to the claims that follow.

What is claimed is:

1. A composition comprising:
    about 80 to about 98.5 parts by weight of a polycarbonate resin;
    about 1 to about 10 parts by weight of a syndiotactic polystyrene resin;
    about 2 to about 15 parts by weight of a core-shell graft copolymer; and
    about 0.5 to about 3 parts by weight of a phosphate ester compound,
    based on 100 parts by weight of the polycarbonate resin, the syndiotactic polystyrene resin, the core-shell graft copolymer and the phosphate ester compound,
    wherein the core-shell graft copolymer is a copolymer of a rubber polymer core and unsaturated monomers grafted to the polymer core;
    the rubber polymer core comprises a $C_{4-6}$ diene rubber, an acrylate rubber, a silicone rubber, or a mixture of a silicone rubber and an acrylate rubber;
    the unsaturated monomers grafted to the rubber polymer core comprise one or more unsaturated monomers selected from the group consisting of $C_1$-$C_8$ methacrylic acid alkyl esters, $C_1$-$C_8$ methacrylic acid esters, $C_1$-$C_8$ acrylic acid alkyl esters, maleic anhydrides, and $C_1$-$C_4$ alkyl or phenyl N-substituted maleimides; and
    the phosphate ester compound is represented by the Formula (II):

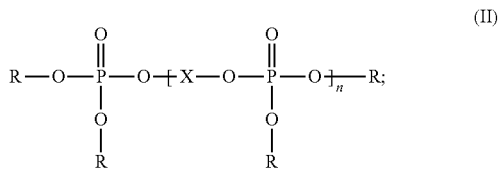

wherein each R is independently selected from $C_{6-20}$ aryl or alkyl-substituted $C_{6-20}$ aryl; each X is independently selected from $C_{6-30}$ arylene or alkyl-substituted $C_{6-30}$ arylene; and n is an integer of 0, 1, 2, or 3 wherein the composition has impact strength of at least about 50 kg·cm/cm when a specimen of the composition is tested according to the standard ASTM D256 A (¼" notched) at 23° C.

2. The composition of claim 1, wherein the polycarbonate resin is one or more selected from the group consisting of a linear polycarbonate, a branched polycarbonate, and a polyester-carbonate copolymer.

3. The composition of claim1, wherein the syndiotactic polystyrene resin has syndiotacticity of greater than 97%.

4. The composition of claim 1, wherein the composition has impact strength of at least about 70 kg·cm/cm when a specimen of the composition is tested according to the standard ASTM D256 A (⅛" notched) at 23° C.

5. The composition of claim 1, wherein the composition has impact strength of at least about 81 kg·cm/cm when a specimen of the composition is tested according to the standard ASTM D256 A (⅛" notched) at 23° C.

6. The composition of claim 1, wherein the composition has impact strength of at least about 57 kg·cm/cm when a specimen of the composition is tested according to the standard ASTM D256 A (¼" notched) at 23° C.

7. The composition of claim 1,
    wherein the composition has Falling Dart impact strength of at least about 1000 N when a specimen of the composition, the specimen measuring 3 mm×100 mm×100 mm, is tested according to the standard ASTM D3029;
    wherein the composition has Falling Dart impact strength of at least about 800 N when a specimen of the composition is subject to a chemical treatment and the chemically treated specimen is tested according to the standard ASTM D3029 and wherein the chemical treatment comprises submerging the specimen in paint thinner for 1 second and thereafter drying the specimen at 80° C. for 30 minutes; and
    wherein the chemically treated specimen has a brittle fracture rate of equal to or less than about 25% after the specimen is tested according to the standard ASTM D3029.

8. The composition of claim 1, wherein the composition has an injection flow length of greater than or equal to about 90 mm, when a specimen of the composition, the specimen in the shape of a spiral, is extruded at 260 to 330° C. from a 10 oz extruder into a mold at 60 to 100° C.

9. The composition of claim 1,
    wherein the composition has Falling Dart impact strength of at least about 1050 N when a specimen of the composition is subject to a chemical treatment and the chemically treated specimen is tested according to the standard ASTM D3029 and wherein the chemical treatment comprises submerging the specimen in paint thinner for 1 second and thereafter drying the specimen at 80° C. for 30 minutes;

wherein the chemically treated specimen has a brittle fracture rate of about 0% after the specimen is tested according to the standard ASTM D3029; and wherein the composition has an injection flow length of greater than or equal to about 90 mm, when a specimen of the composition, the specimen in the shape of a spiral, is extruded at 260 to 330° C. from a 10 oz extruder into a mold at 60 to 100° C.

10. The composition of claim 1, wherein the polycarbonate resin comprises a linear polycarbonate including bisphenol A.

11. The composition of claim 10, wherein the rubber polymer core of the core-shell graft copolymer comprises one or more rubbers selected from the group consisting of $C_{4-6}$ diene rubbers and silicone rubbers and wherein the unsaturated monomers grafted to the polymer core comprises one or more $C_1$-$C_8$ (meth)acrylic acid alkyl esters.

12. The composition of claim 11, wherein the phosphate ester compound comprises a compound of Formula (II) in which R is 2,6-dimethylphenyl, X is derived from resorcinol, and n is 1 or a compound of Formula (II) in which R is phenyl and n is 0.

13. The composition of claim 12, wherein the wherein the composition has:
a Falling Dart impact strength of at least about 1000 N when a specimen of the composition, the specimen measuring 3 mm×100 mm×100 mm, is tested according to the standard ASTM D3029;
a Falling Dart impact strength of at least about 800 N when a specimen of the composition is subject to a chemical treatment and the chemically treated specimen is tested according to the standard ASTM D3029 and wherein the chemical treatment comprises submerging the specimen in paint thinner for 1 second and thereafter drying the specimen at 80 ° C. for 30 minutes;
the chemically treated specimen has a brittle fracture rate of equal to or less than about 20% after the specimen is tested according to the standard ASTM D3029; and
an injection flow length of greater than or equal to about 90 mm, when a specimen of the composition, the specimen in the shape of a spiral, is extruded at 260 to 330° C. from a 10 oz extruder into a mold at 60 to 100° C.

14. The composition of claim 1, wherein the rubber polymer core comprises silicone rubber.

15. The composition of claim 14, wherein the rubber polymer core further comprises acrylate rubber.

16. The composition of claim 14, wherein the silicone rubber is produced from one or more cyclosiloxanes selected from the group consisting of hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane.

17. The composition of claim 1, wherein the composition is in the form of a shaped article.

18. An electronic device, comprising
an electrical circuit; and
a housing enclosing at least part of the electrical circuit, the housing comprising a portion, which comprises the composition of claim 1.

19. A composition comprising:
about 80 to about 98.5 parts by weight of a polycarbonate resin;
about 1 to about 10 parts by weight of a syndiotactic polystyrene resin;
about 2 to about 15 parts by weight of a core-shell graft copolymer; and
about 0.5 to about 3 parts by weight of a phosphate ester compound,
based on 100 parts by weight of the polycarbonate resin, the syndiotactic polystyrene resin, the core-shell graft copolymer and the phosphate ester compound,
wherein the core-shell graft copolymer is a copolymer of a rubber polymer core and unsaturated monomers grafted to the polymer core, wherein the rubber polymer core comprises a butadiene rubber or a silicone rubber optionally in combination with an acrylate rubber, and wherein the unsaturated monomers grafted to the polymer core comprise one or more $C_1$-$C_8$ (meth)acrylic acid alkyl esters;
wherein the phosphate ester compound is represented by the Formula (II):

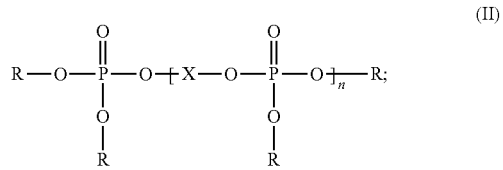

wherein each R is independently selected from $C_{6-20}$ aryl or alkyl-substituted $C_{6-20}$ aryl; each X is independently selected from $C_{6-30}$ arylene or alkyl-substituted $C_{6-30}$ arylene; and n is an integer of 0, 1, 2, or 3; and wherein the composition has:
a Falling Dart impact strength of at least about 1000 N when a specimen of the composition, the specimen measuring 3 mm×100 mm×100 mm, is tested according to the standard ASTM D3029;
a Falling Dart impact strength of at least about 800 N when a specimen of the composition is subject to a chemical treatment and the chemically treated specimen is tested according to the standard ASTM D3029 and wherein the chemical treatment comprises submerging the specimen in paint thinner for 1 second and thereafter drying the specimen at 80 ° C. for 30 minutes;
the chemically treated specimen has a brittle fracture rate of equal to or less than about 25% after the specimen is tested according to the standard ASTM D3029; and
an injection flow length of greater than or equal to about 90 mm, when a specimen of the composition, the specimen in the shape of a spiral, is extruded at 260 to 330° C. from a 10 oz extruder into a mold at 60 to 100° C.

20. The composition of claim 19, wherein the polycarbonate resin comprises a linear polycarbonate resin including bisphenol A; the rubber polymer core comprises a silicone rubber, optionally in combination with an acrylate rubber; and the phosphate ester compound comprises a compound of Formula (II) in which each R is 2,6-dimethylphenyl, X is derived from resorcinol, and n is 1 or a compound of Formula (II) in which each R is phenyl and n is 0.

* * * * *